US008304087B2

(12) United States Patent
Perrier et al.

(10) Patent No.: US 8,304,087 B2
(45) Date of Patent: Nov. 6, 2012

(54) PROCESS FOR TREATING WOOD FOR INCREASING THE LIFETIME THEREOF AND WOOD THUS OBTAINED

(75) Inventors: Michel Perrier, Montréal (CA); Jean-Francois Labrecque, Montréal (CA); Michel Robitaille, Varennes (CA); Louis Gastonguay, Varennes (CA)

(73) Assignee: Hydro-Quebec, Montreal, Quebec (CA)

( * ) Notice: Subject to any disclaimer, the term of this patent is extended or adjusted under 35 U.S.C. 154(b) by 567 days.

(21) Appl. No.: 12/525,263

(22) PCT Filed: Feb. 20, 2008

(86) PCT No.: PCT/CA2008/000321
§ 371 (c)(1),
(2), (4) Date: Jul. 30, 2009

(87) PCT Pub. No.: WO2008/101331
PCT Pub. Date: Aug. 28, 2008

(65) Prior Publication Data
US 2010/0092782 A1    Apr. 15, 2010

(30) Foreign Application Priority Data
Feb. 21, 2007    (CA) .................................... 2578703

(51) Int. Cl.
*B32B 23/04*    (2006.01)
(52) U.S. Cl. ..... 428/532; 428/535; 428/536; 428/537.1; 427/322; 427/325; 427/393
(58) Field of Classification Search .................. 428/532, 428/537.1, 535, 536; 427/322, 325, 393
See application file for complete search history.

(56) References Cited

U.S. PATENT DOCUMENTS

| 1,936,439 | A |   | 11/1933 | C.H. Siever |
|-----------|---|---|---------|-------------|
| 3,765,934 | A |   | 10/1973 | Gaylord |
| 4,076,540 | A |   | 2/1978  | Stossel |
| 4,738,878 | A |   | 4/1988  | Anderson et al. |
| 4,761,179 | A |   | 8/1988  | Goettsche et al. |
| 5,395,656 | A | * | 3/1995  | Liang ............................ 427/393 |
| 5,553,438 | A |   | 9/1996  | Hsu |
| 5,582,871 | A |   | 12/1996 | Silenius et al. |
| 5,731,090 | A | * | 3/1998  | Chen ........................... 428/423.5 |
| 6,168,870 | B1|   | 1/2001  | Wall |
| 7,160,606 | B2|   | 1/2007  | Wall et al. |

FOREIGN PATENT DOCUMENTS

| CA | 2502878 A1 |   | 5/2003 |
| WO | WO2007109898 | * | 4/2007 |
| WO | WO 2007/109898 A1 |   | 10/2007 |

OTHER PUBLICATIONS

Bizak, Niyazi et al., "Crosslinked Polymer Gels for Boron Extraction Derived from N-glucidol-N-methyl-2-hyroxypropyl methacrylate," Macromolecular Chemistry and Physics, vol. 201, No. 5, pp. 577-584, (2000).
"The Rheology Handbook: For Users of Rotational and Oscillatory Rheometers," by Thomas G. Mezger, Hanover: Vincentz Verlag (2002), edited by Dr Ulrich Zorll (ISBN 3-87870-745-2), p. 143.
International Search Report dated Jun. 4, 2008 in corresponding PCT/CA2008/000321.

* cited by examiner

*Primary Examiner* — Leszek Kiliman
(74) *Attorney, Agent, or Firm* — Buchanan Ingersoll & Rooney

(57) ABSTRACT

Process for treating wood consisting in injecting in cavities of the wood a solution of at least one fungicide and/or bactericide and/or insecticide and at least one monomer that can progressively form a polymer matrix in the cavities of the wood and then a gel in the cavities of the wood. The treated woods thus obtained exhibit an improved lifetime.

41 Claims, 2 Drawing Sheets

PROCESS FOR TREATING WOOD FOR INCREASING THE LIFETIME THEREOF AND WOOD THUS OBTAINED

The present invention relates to a process for treating wood, which allows remarkably increasing the service life of articles in wood thus treated, in particular when the latter are subjected to mold, fungus or bacteria.

BACKGROUND

Niyazi Bizak, H. Onder Ozbelge, Levent Yilmaz, B. Filiz Senkal (2000), Macromolecular Chemistry and Physics, vol. 201, num. 5, pp. 577-584 describes the synthesis of boron binding gels and its use for water treatment.

U.S. Pat. No. 4,738,878 (Anderson et al.) describes an in situ wood treatment, applied to a wooden railroad tie. The method comprises the injection of a paste-like preparation in one or several unoccupied spike holes that are present in the rail supporting the tie plate, said preparation containing a water soluble fungicide. The preparation, by lodging in cracks and recesses in communication with the spike hole, kills the existing fungus. As time passes, the fungicide follows the existing or subsequently developed moisture paths up to the most remote sites. This treatment does not use any gels to fill the cavities produced by natural wood degradation agents or to fill a cavity intentionally made.

U.S. Pat. No. 5,553,438 (Hsu) mentions that the service life of a wood pole such as a utility pole is increased if the base of the pole comprises slots penetrating deeply in the wood. These slots are formed prior to pressure treatment of the wood with preservative agents and they improve the penetration of the wood preservative agents. After drying, the butt end of the pole is encased in a shell, suitably of polymeric material, that is bonded to the butt end of the pole and provides a barrier to penetration of fungus or insects, and prevents the passage of liquids which might leach the preservative agent from the pole into the surrounding ground.

U.S. Pat. No. 5,582,871 (Silenius et al.) describes a method for preserving wood against undesirable reactions caused by microorganisms. The method also concerns wood preserved against molds, blue-stain fungi and rot fungi. According to the method, the wood being preserved is treated with a substance capable of inhibiting the growth of microorganisms. This substance penetrates into the wood rather deeply than superficially. This substance is a complexing agent, e.g., EDTA, which is capable of binding transition metals contained in the wood. An aqueous EDTA solution is used to impregnate the wood, and when the wood is impregnated, the complexing agent is precipitated from the aqueous phase. The complexing agent can be precipitated by lowering the pH of the wood, or alternatively, altering the temperature of the wood after the impregnation step. According to the method, the complexing agent precipitated into the wood forms a reserve depot. The complexing agent re-dissolving from the depot is capable of binding transition metals entering the wood via rainwater or contamination.

U.S. Pat. No. 4,761,179 (Goettsche et al.) describes a wood preservative based on a water-dilutable formulation of the compound di-(N-cyclohexyldiazoniumdioxy)-copper, a polyamine, a complex-forming carboxylic acid and, if required, a salt having a fungicidal anion which has a pH in the aqueous solution of not less than 7.5 in the conventional concentration for use U.S. Pat. No. 6,168,870 (Wall) describes a method of impregnating wood with a plastic plug containing a wood preservative agent. A first step involves dehydrating the polymer plastic plug to reduce its naturally occurring moisture content. A second step involves introducing a liquid wood preservative agent into the polymer plastic plug while it is in a dehydrated state by immersing it in the liquid wood preservative agent and boiling the liquid wood preservative agent at temperatures that are less than that required to turn the polymer plastic plug into a molten state. In accordance with the technique of this method, the liquid wood preservative agent is absorbed into the dehydrated polymer plastic plug in place of the naturally occurring moisture content.

U.S. Pat. No. 7,160,606 (Wall et al.) describes a method of treating building materials with boron and boron treated building materials. The method involves introducing boron during manufacture of the building materials in the form of a water soluble copper-borate complex. The copper-borate complex enables a wider range of glues and adhesives to be used, is slower to leach out, and provides enhanced fungicidal properties.

There was thus a need for a new wood treatment process deprived of the drawbacks commonly associated with the known prior art processes, namely the toxicity, the high cost, a time limited protection efficiency due to fast leaching by rain waters, and allowing to substantially improve the service life of the treated wood article, when the latter is subjected to aggressive elements of the environment in which it is used.

SUMMARY

A first object of the present invention is to provide a process for treating a wooden article in order to increase its lifetime.

A second object of the present invention is formed of the treated wooden article obtained by performing said process. Such a wooden article is characterized by an increase of at least 50% of the expected residual lifetime.

The process according to the present invention comprises introducing a treating composition into at least one cavity of a wooden article, and it is characterized in that the composition contains:

- at least one wood preserving agent selected from the group consisting of fungicides, bactericides and insecticides;
- a chelating agent capable of complexing at least one preserving agent;
- a polymer precursor capable of forming a polymer matrix after injection into the cavities;
- optionally a liquid support; and
- optionally a surfactant.

When the polymer precursor is not liquid at the working temperatures of the treating composition, the treating composition necessarily contains a liquid support. When the precursor is liquid at the working temperatures of the treating composition, the treating composition does not necessarily contains a liquid support.

The content of preserving agent in the treating composition may range up to the saturation concentration at the working temperature, which depends on the preserving agent used, and the solubility of the agent in the polymer precursor and/or in the liquid support. It is preferably from 0.1% to 10% and preferably from 0.1% to 2% by weight.

The treating composition preferably has, at the moment that it is introduced into an article to be treated, a viscosity of less than 100 Pa·s at 20° C., in order for it to be able to satisfactorily impregnate the article to be treated.

An amount of composition sufficient to partially or totally impregnate the cavities of the wooden article is introduced. When the composition is introduced into the wood, it gradually becomes transformed into a gel.

The degree of impregnation of the solution depends on the state of the walls of the cavity and the porosity of the wood surface inside the cavity. It may increase considerably for cavities that are greatly attacked by wood rot.

Introduction of the treating composition into the article to be treated is advantageously performed by injection at a pressure below 10 atm and preferably between 1 and 2 atm.

The process of the invention allows wood to be protected against molds, fungi and insects. It may be performed preventively on undamaged wooden articles, or curatively on wooden articles that are already substantially damaged by the attacking factors naturally present in the surrounding medium.

When the process of the invention is performed as a preventive treatment, at least one orifice is drilled into the wooden article, into which the treating composition is injected. It is preferable for the wooden article to be drilled with several orifices in order to improve the quality and speed of impregnation. The orifices are preferably cylindrical, with or without branching. When the article that is to be treated is a pole fixed into the ground and when the orifices are placed above and close to the ground, the orifices are preferably less than 10 cm above the ground level, and they form, with the ground level, an angle of less than 60° and preferably between 5° and 50°.

When a wooden article has suffered a partial deterioration that has created an inner cavity, at least one orifice is drilled into the wooden article, preferably in the form of a channel that connects the surface of the article to an inner cavity, preferably to the upper part of the cavity. If the article comprises several inner cavities, several channels may be drilled so as to connect several cavities to the surface of the article. The treating composition is then injected into the cavities via the channels. The present invention also relates to objects made essentially of wood treated by means of the process of the invention.

DETAILED DESCRIPTION OF PREFERRED EMBODIMENTS

Figure 1A:
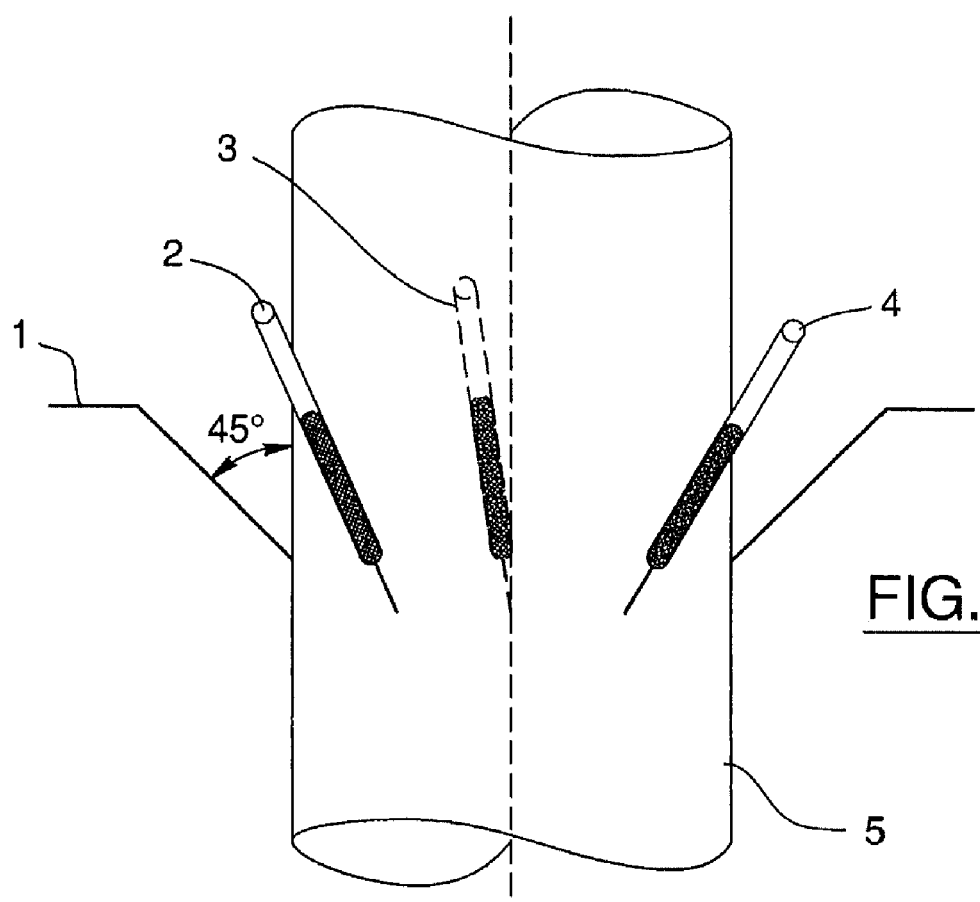
FIGS. 1A and 1B are views in elevation and in cross section representing a wooden pole into which orifices have been drilled after exposing part of the base of the pole buried in the ground.

With reference to FIG. 1A, a wooden pole 5 is shown, into which have been drilled three cylindrical orifices 2, 3, 4 symmetrically and at an angle of 45° relative to the ground level 1. These orifices 2, 3, 4 were drilled after exposing part of the base of the pole 5 buried in the ground.

Figure 1B:
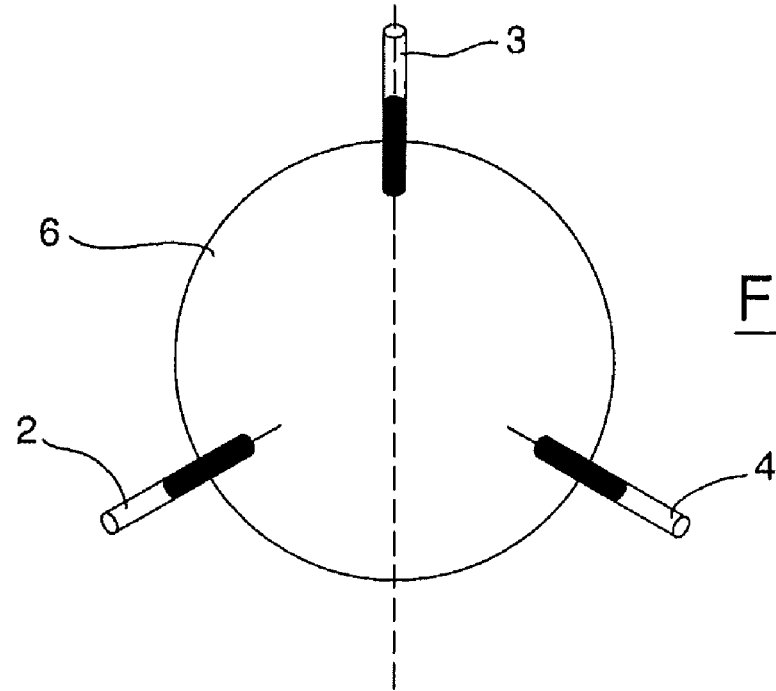

With reference to FIG. 1B, a view in cross section 6 of the pole is shown, showing the position of the orifices.

Figure 2:
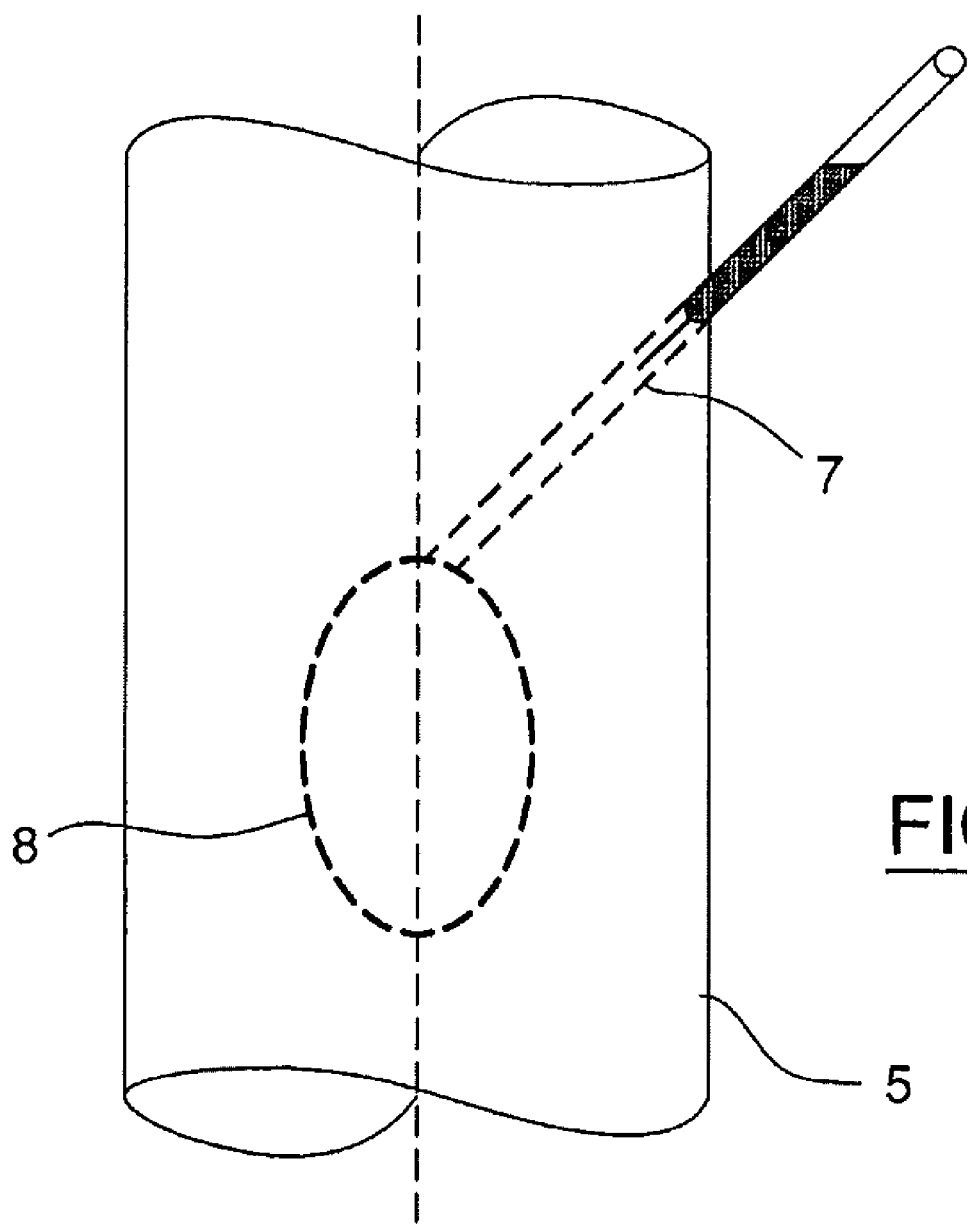
FIG. 2 is a view in elevation representing a wooden pole into which an orifice has been drilled at an angle of 45° relative to the ground level, in order to join up to an inner cavity to be treated.

With reference to FIG. 2, a wooden pole 5 is shown, into which has been drilled a cylindrical orifice 7 at an angle of 45° relative to the ground level, so as to join up with an inner cavity to be treated 8, the orifice 7 reaching the top of the cavity 8.

After injecting the treating composition into the wooden article to be treated, the precursor(s) of the polymer matrix polymerize(s) and become(s) transformed into a gel. The gel is formed by the polymer matrix and the liquid support. It contains one or more chelating agents and one or more preserving agents. The preserving agent(s) is (are) trapped in the gel. The preserving agent is held more or less tightly in the gel depending on whether it is chelated via a chelating agent that is or is not grafted onto the polymer matrix.

In the context of the present invention, a gel will be considered as a material comprising a liquid part trapped in a polymer network, the rheological behavior of which is such that the storage modulus G' is greater than the loss modulus G", said moduli being calculated according to the method described in "The Rheology Handbook: For users of rotational and oscillatory rheometers" by Thomas G. Mezger, Hanover: Vincentz Verlag, 2002, edited by Dr Ulrich Zorll (ISBN 3-87870-745-2), p. 133.

The gel formed in the cavities has the following characteristics:
- a water solubility at room temperature of at least 10% and preferably of at least 95%;
- a content of fungicidal agent corresponding to a concentration that is between 0.1% and 10% by weight of the solution;
- rheological characteristics of the gel such that a standard rheological measurement demonstrates that, in the region of the working temperature, the storage modulus (G') is greater than the loss modulus (G");
- the bonds of the gel with the wood, if present, are of physical type (adhesion to the surface of the wood or gel penetration into the wood cells) or chemical type (modification of the wood; reaction of the monomers with the hydroxyl functions present on the walls of the wood cells);
- a swelling power in the presence of water that is, when measured according to the weighing method, at least greater than 5% of the weight of polymer formed; and
- a time necessary for the formation of the gel that is short enough for the composition to remain sufficiently fluid to be able to be injected and to diffuse into the article to be treated before gelation, but preferably less than 2 hours, the formation of gel being observed visually.

The preserving agent may be a fungicide chosen, for example, from boron compounds, phosphates, silicates, copper sulfate and sodium fluoride.

Boron-containing fungicides are preferred, in particular boric acid, borax and sodium octaborate. These compounds may be readily complexed.

The treating composition may comprise two fungicides, for example a boron compound and an additional compound that is not readily complexable. Said additional compound may be an excess of boron compound relative to the amount of chelating agent, a fluoride, a copper tebuconazole compound [copper α-[2-(4-chlorophenyl)ethyl]-α-(1,1-dimethylethyl)-1H-1,2,4-triazole-1-ethanol], an alkaline quaternary ammonium copper compound (ACQ) or a chromated copper arsenate (CCA).

According to one advantageous embodiment, the treating composition that is injected into the cavities of the wood is an at least 0.015 M, preferably at least 0.2 M and more preferentially about 0.5 M preserving agent solution, the preserving agent being lauric acid or a boric acid substitute such as sodium octaborate.

The preserving agent may be a bactericide chosen, for example, from copper sulfate and sodium perborate.

The preserving agent may be an insecticide chosen from the insecticides used in the prior art for treating wood, in particular the boron compounds that are mentioned above as fungicides.

A treating composition used in the process of the invention contains at least one compound acting as a chelating agent for at least one preserving agent. The chelated preserving agent will be less easily leached, especially when the wooden article is subjected to bad weather.

In one particular embodiment, the chelating agent is chosen such that it chelates the preserving agent and becomes attached to the polymer matrix or to its precursor. This configuration allows more efficient retention of the preserving agent by avoiding rapid leaching with water. This results in gradual release of the preserving agent over a long period.

The boron-complexing agent is a chemical compound comprising hydroxyl and/or amine and/or carboxylic acid functions. It is preferably chosen from the group constituted by polyamines, polyols and polyolamines, and mixtures thereof. In a compound that comprises an amine group, the amine is preferably primary or secondary. A polyol is preferably a diol, more particularly a diol in which the hydroxyl groups are vicinal. Polyols that contain from 2 to 7 carbon atoms in their chain are preferred. A compound that contains vicinal hydroxyl groups and a nitrogen atom can chelate boron or copper compounds, and become attached to a polymer matrix or to a suitable polymer precursor, for example a glycidyl methacrylate (GM) or glycidyl acrylate (GA). The presence of a nitrogen atom close to the OH groups stabilizes the bond that forms between the hydroxyl groups of the chelating molecule and the boron. Examples that may be mentioned include n-methyl-D-glucamine (NMG) and tris(hydroxymethyl)aminomethane (THAM), 1,3-bis[tris(hydroxymethyl)-methylamino]propane, (hydroxyethyl)amine, di(hydroxyethyl)amine, and iminodicarboxylic acids such as iminodiacetic acid.

Other compounds may be used to chelate the preserving agent, without attaching to the polymer matrix or to its precursor. Mention may be made in particular of ethylenediaminetetraacetic acid (EDTA), which may be used as a complexing agent for complexing a preserving agent based on a transition metal, for example copper sulfate or CCA.

The treating composition contains one or more precursors capable of forming a polymer matrix after injection into the cavities of the wooden article to be treated. The precursors may be chosen from acrylic acid, ethers, glycols, amines, halides, acrylamides, vinylpyrrolidone, vinyl alcohol, acrylates and organohalosilanes.

In one embodiment, the solution contains two different precursors that react to form a polymer matrix. In this case, the treating composition may be prepared by first mixing one of the precursors, referred to as precursor 1, with at least one preserving agent, and then adding the second precursor (referred to as precursor 2) and at least one chelating agent, precursor 1 being chosen such that it contains functions that allow it to graft the chelating agent, and then to react with precursor 2. The grafting of the chelating agent of the preserving agent onto precursor 1 thus makes it possible to avoid excessively rapid leaching of the preserving agent.

It is preferable for the ratio of the reactive functions of precursor 1 relative to the reactive functions of precursor 2 to correspond substantially to the stoichiometry.

When the treating composition contains a support liquid, the total content of the three compounds (chelating agent, precursor 1 and precursor 2) in the treating composition is preferably at least 5% by weight.

The content and nature of the three compounds (precursor 1, precursor 2 and chelating agent) in the treating composition are chosen so as to obtain the mechanical properties desired for the gel, namely:

a capacity to maintain a good interface between the gel and the wood;

small variations as a function of the environmental exposure as regards the water content of the gel; and slow and constant dissolution of the preserving agent over a period ranging from 2 to 10 years, while at the same time maximizing the amount of preserving agent that can be incorporated into the gel formed, the maximum targeted preserving agent content preferably being 5% by weight in the treating composition.

In one embodiment, the precursors are chosen with a view to obtaining a polymer of the polyepoxy type. Such a polymer may be obtained by using as precursor 1 a compound containing at least two glycidyl ether groups and as precursor 2 a compound containing at least two groups capable of reacting with a glycidyl ether group, said groups possibly being, for example, primary or secondary amine groups, OH groups, or anhydride groups. Precursor 1 may be a polyethylene of low mass having a glycidyl ether group at each of its ends (PEGDGE). The polyethylene chain of the PEGDGE has a molecular mass of less than 1000 g/mol and preferably less than 400 g/mol, in order to facilitate its impregnation into the porosity of the wood. An excessively high molar mass prevents the diffusion of the molecule through the wood cells. Precursor 1 may be, for example, ethylene glycol diglycidyl ether, diethylene glycol diglycidyl ether, 1,4-butanediol diglycidyl ether or a polyethylene glycol diglycidyl ether. Precursor 2 may be an amine, for example an alkylene polyamine, more particularly an alkylenediamine in which the alkylene group contains from 1 to 10 carbon atoms.

Water-soluble precursors are preferably chosen.

In one particular embodiment, precursor 1 is a PEGDGE and precursor 2 is an alkylenediamine. In a preliminary step, the diamine is mixed with a chelating agent with which it does not react (for example NMG). Immediately before the moment of injection of the treating composition into the article to be treated, precursor 1 and the preserving agent are added. After injection, the two precursors react to form a polymer matrix that then becomes transformed into the gel. The preserving agent is chelating with NMG that is attached via chemical bonding to the polymer matrix.

In general, the order of introduction of the constituents into the treating composition is not critical. However, the constituents that are liable to react together should be placed in contact just before using the composition. For example, during the preparation of a composition for forming an epoxy resin, the two precursors of the polymer are placed in contact only at the time of injection, in order to keep the treating composition in a sufficiently fluid state to enable injection and infiltration into the cavities of the article to be treated. Similarly, a chelating agent that contains an amine function will be placed in contact at the last moment with a polymer precursor capable of reacting with an amine function.

The proportions of the polymer precursors may vary. It is preferable for the number of glycidyl functions in precursor 1 to be equivalent to the number of amine hydrogen atoms in precursor 2 and in the chelating agent. The chelating agent/preserving agent mole ratio is preferably 2, when the preserving agent is a boron compound. However, the boron preserving agent may be in excess relative to the chelating agent.

It is noted that, for the formation of a polymer of the epoxy type, it is not necessary to heat the solution or to add an initiator. However, the gelling process may be accelerated by gently heating the solution before injection into the cavity.

The precursor may also be chosen from those that polymerize in the presence of a thermal or photochemical initiator. The composition then also contains a suitable polymerization initiator, and the treatment process comprises an additional step that consists in heating or irradiating the treating composition after injection. This additional step may be performed by means of a heating or irradiation device inserted into the orifice via which the treating composition has been injected. Examples of precursors that may be mentioned include monomers bearing vinyl groups, such as acrylic derivatives (acrylic acid, acrylates, acrylamides, vinyl alcohol, vinylpyrrolidone), monomers bearing vinyl glycidyl ether functions or monomers bearing epoxy groups or siloxane groups. The polymer matrices formed in the cavities of the wooden article treated with said monomers are water-soluble.

According to one embodiment of the process in which the preserving agent is a boron compound, it may be chelated with a compound bearing vicinal hydroxyl groups and an amine group, for instance NMG or THAM. NMG or THAM may also be attached to a compound comprising a glycidyl group and another functional group allowing polymerization. A treating composition that may be used in the process of the invention may thus be obtained by reacting NMG with a glycidyl methacrylate (GM) to form a monomer bearing a chelating group, followed by adding a preserving agent.

The liquid support of the treating composition is formed essentially by water or a non-toxic organic solvent that is not environmentally unfriendly. Among these organic solvents, mention may be made of alcohols and ketones. The water and/or the sparingly toxic organic solvent constitute(s) at least 50% by weight of the liquid support. The liquid support may be a mixture of water and of at least one organic solvent.

The process of the invention enables control of the kinetics of release of the preserving agent in the cavities of a wooden article, by the polymer matrix, and then by the gel present in said cavities, via the choice of the content of solvent and/or of preserving agent in the treating composition.

When the preserving agent is a fungicide, the stability of the fungicide in the gel undergoing formation or in the formed gel may be reduced by increasing the boron concentration in the treating solution and consequently in the polymer matrix. Greater release and thus a more substantial initial treatment of the wood is thus obtained. A low concentration of fungicide induces greater stability of the bond between the complexing agent and the boron-based preserving agent not instantly released into the wood to be treated and thus a slower rate of release.

The process of the present invention is firstly directed toward increasing the lifetime of wooden articles, in particular of wooden poles in an electricity distribution network. Preservation is performed by injecting a composition into cavities of the wooden articles, said composition forming a gel after injection. The treatment may be performed before degradation of the article, by drilling apertures into the article for injection of the treating composition. The treatment may also be performed after degradation of the article with formation of cavities, the composition being injected into the cavities formed. By acting on cavities present in the structure of the wood, the progress of the rot responsible for fungal degradation and/or the progress of insects (especially termites) and/or bacteria in the wood matrix is considerably reduced. This intervention also makes it possible to partially recover the mechanical properties of the original matrix. This regeneration of the properties of the wood may be obtained by adding a polymeric gel that has a good interface with the walls of the cavity that is in the wood. In order to remove the degrading rot, this gel contains a fungicide fixed to the polymer matrix via a chelating agent grafted onto the matrix. The complexing agent is used in order to reduce the migration of a water-soluble fungicide. The presence of this chelating agent makes it possible to prolong the duration of efficacy of such a treatment. A preventive treatment may be performed by drilling cavities into the wood from the surface of the wooden article. For an electrical utility pole, this intervention takes place mainly in the area of contact with the ground. The treating composition is injected into these cavities. When this treatment is performed at regular intervals, it can considerably increase the lifetime of healthy wooden articles.

The use of a treating composition that contains a preserving agent and an agent for complexing this agent makes it possible to treat the wood more efficiently during use. During routine inspections, it is possible to observe the presence of cavities in the core of a wooden matrix and to perform the process for curative purposes.

The preventive and curative treatments are directed toward reducing the costs associated with replacing the wooden matrices (poles, beams, floorboards, etc.) by "healing" the cavities or via a preventive treatment of the materials used.

The process of the invention is particularly useful for treating a wooden article against molds and fungi. When a treating composition according to the invention, which contains one or more fungicides as preserving agents, is injected into the article to be treated, it impregnates the walls of the wood and, via the presence of the fungicides, it eliminates the rot that is active at the surface. This composition, which is initially sparingly viscous, can also infiltrate deeply into all the interstices created by the rot fungi. Depending on the state of degradation of the surface of the cavity, close to 10% to 30% of the solution poured in migrates into the wood matrix. Next, the constituents of the composition react and a gel is formed.

The time needed for the gelation should be such that it allows good impregnation of the article to be treated and good migration of the preserving agent into said article. The gelling time should, however, remain short enough for reasons of convenience of implementation. Generally, a time of 10 minutes to 2 days and preferably less than 2 hours is desired for the gelation. The gelling time may be adjusted by means of the choice of polymer precursors. A precursor of low mass, having a high content of reactive functions, will react much more quickly than a precursor of high mass (having a slower rate of rotation and of diffusion). The gelling time may also be adjusted by means of the choice of the concentrations.

Optionally, the moisture contained in the wood matrix may cause swelling of the gel. This swelling promotes an effective interface between the gel and the interior of the cavity. This good contact with the interface enables long-term preservation of the wood structure. The reason for this is that an optimal interface between these two constituents promotes slow but constant migration of the antifungal agent into the wood matrix.

When the wooden article comprises cavities generated by insects, the treatment process is performed using a composition in which the preserving agent is an insecticide.

A treating composition may contain one or more surfactants, in order to improve the dispersion of the various constituents in the support liquid used and the physical properties of the composition. The surfactant may be chosen, for example, from nonionic surfactants (for example block copolymers based on ethylene oxide and propylene oxide) and ionic surfactants (for example sodium dodecyl sulfate, ammonium lauryl sulfate, benzalkonium chloride and a polyoxyethylene amine). When the treating composition contains a boron compound as preserving agent, the boron concentration is between 0.1 g/l (1.6 mM of boric acid) and the solubility limit of the boron compound in the support liquid. The concentration of boron compound in the composition is preferably between 1 g/l (16 mM of boric acid) and 50 g/L (800 mM of boric acid) of solution.

As the gel formed has a good interface with the walls of the cavity, it will make it possible to improve the mechanical properties of the treated sample and/or will prevent recolonization of the cavity by creating a physical barrier to degradation-causing fungi, bacteria or insects.

The implementation examples that follow are given purely as illustrations and shall not in any way be interpreted as constituting a limitation of the present invention.

In the examples that follow, the wood treatment may be performed on a degraded section of a pole. After having located the degraded area of the pole, a hole is drilled into the uppermost part of the cavity (as illustrated in FIG. 2). A composition is prepared according to one of the following examples, and is then injected into the cavity until this cavity is totally or partially filled. Example A describes compositions for forming an epoxy gel, and Example B describes compositions for forming a gel of the polyacrylate type.

EXAMPLE A

Polyepoxy Gel

A treating composition is prepared from solution 1 below:
Solution 1
5 g of $H_3BO_3$ (boric acid)
5 g of EDA (ethylenediamine)
31.6 g of NMG (N-methylglucamine)
100 ml of water
At the time of use, 130 g of PEGDGE (polyethylene glycol (400) diglycidyl ether) were added and rapidly mixed, and the resulting composition was immediately injected into the cavity of a wooden article. The injected composition forms a gel after an interval of one hour. During this gel-forming time, from 10% to 30% of the solution migrates into the wood cells.

The procedure was reproduced, modifying the proportions of the constituents of the composition. The amounts, in grams, for all the compositions prepared are given in Table 1 below.

TABLE 1

| Sample | Solution 1 | | | | PEGDGE |
| | $H_3BO_3$ | EDA | NMG | $H_2O$ | |
|---|---|---|---|---|---|
| 1 | 5 | 5 | 31.6 | 100 | 130 |
| 2 | 3 | 5 | 31.6 | 100 | 130 |
| 3 | 7 | 5 | 31.6 | 100 | 130 |
| 4 | 10 | 5 | 31.6 | 100 | 130 |
| 5 | 5 | 5 | 31.6 | 50 | 130 |
| 6 | 5 | 5 | 31.6 | 150 | 130 |

This gelation period allows a first treatment of the wood by deep sterilization of the surface of the cavity. It also makes it possible to obtain an excellent interface between the cavity and the wood. This makes it possible to partially restore the mechanical properties lost by the degradation of this section of the pole.

Test of the Degree of Retention of Boron in the Polymer Matrix of the Gels Formed In order to evaluate the properties imparted to the treated wood by the various treating compositions, cubes with a side length of 19 mm constituted by the sapwood part of a wood were treated under vacuum for 30 minutes with each of the compositions 1 to 6. Next, the blocks were left at room temperature overnight in order to allow formation of the gel. They were then immersed in 30 ml of demineralized water. Monitoring of the boron content by ICP (Inductively-Coupled Plasma) spectroscopy makes it possible to determine the rate of release of boric acid as a function of time. This measurement is performed in order to estimate the boron retention capacity of the polymer matrices under conditions of accelerated diffusion.

Table 2 gives the loss of boron 1B in the matrix, expressed as a percentage, as a function of the immersion time of the block in the aqueous solution.

TABLE 2

| Sample | Day 1 lB | Day 4 lB | Day 7 lB | Day 12 lB |
|---|---|---|---|---|
| 1 | 6.6 | 12.9 | 16.5 | 18.7 |
| 2 | 5.7 | 10.3 | 13.0 | 14.7 |
| 3 | 21.5 | 31.7 | 36.2 | 39.3 |
| 4 | 58.7 | 73.4 | 79.4 | 83.2 |
| 5 | 47.9 | 48.5 | 50.9 | 52.4 |
| 6 | 5.9 | 11.6 | 14.9 | 17.1 |

The results obtained demonstrate the strong influence of the water content or of the boron concentration in the treating composition. By increasing the boric acid content (Examples 3 and 4) or by reducing the solvent content (Example 5), the boron retention capacity in the matrix is significantly reduced. These variations, relative to Example 1, are harmful to good dispersion of boric acid in the solution. An excessively low water content will promote precipitation of the boron. It is important, however, to note for this example (Example 5) that the boron content is stable after an initial loss of close to 50%. It thus appears to be an excess of boron that might be used during the initial treatment of the cavity. The other half will remain in the matrix and will be released gradually. This is one of the strategies that may be envisioned for the treatment.

A reduction in the boron content (Example 2) or an increase in the amount of water in the solution (Example 6) have little effect on the level of boron retention relative to Example 1.

By modifying the gelling parameters, the content of antifungal agent and the amount of water used, it appears possible to considerably modify the degree of retention of the antifungal agent in the gels thus drilled. Thus, the amount of the boron-based compound can be modified so as to use it more during a step of stabilization of the wood matrix or, in the longer term, by slow and gradual release. The composition selected will also vary according to the intended application: sterilization of an existing cavity or preventive treatment at the base of a pole.

Test of the Degree of Boron Retention in the Cavity of a Treated Wood Matrix

A second test is directed toward determining the rate of diffusion of boron into wood from a gel formed in a cavity. For this evaluation, a cube with a side length of 5.08 cm was used. On the surface representing the exterior of a pole, a hole 4.45 cm deep and 1.64 cm in diameter was drilled. 9.5 ml of the solution obtained from Example 3 were poured into this hole, so as to fill the cavity. After one hour, the solution had gelled and close to one milliliter of the poured solution (about 11%) had diffused into the wood.

The block was then immersed up to its surface in 150 ml of demineralized water. Monitoring of the boron content in solution demonstrates that after 6 days of immersion, only 10% of the boron had managed to migrate into the aqueous solution.

An analysis of the wood using lengths extracted in the longitudinal axis (direction of the fibers) and in the transverse axis demonstrates that the boron migrates mainly in the longitudinal axis, the diffusion factor being 10 times greater in this axis. This result was foreseeable since this is the natural axis of migration of sap in a tree.

After this immersion period, the residual boron content in the polymer matrix that is in the cavity was also analyzed. Analysis by ICP spectrometry demonstrates that there is still 50% of the boron present in the length despite its immersion in water. This test was performed to evaluate, according to an accelerated process, the extracting power of water with respect to the preserving agent used.

This immersion was performed in order to accelerate the boron extraction process and to evaluate the capacity of this gel to retain this water-soluble fungicide. The tests performed show that the rate of diffusion of the boron and the residual boron content after a certain time depends on the composition used. This type of test makes it possible, for a "preserving agent, polymer matrix precursors, chelating agent" combination, to determine the content of each of the ingredients, depending on the rate of diffusion that is desired for the article to be treated.

EXAMPLE B

Polyacrylate Gel

A polyacrylate gel was prepared via the method proposed by Bizak et al. mentioned above. The monomer is obtained by reacting glycidyl methacrylate (GM) with n-methylglucamine (NMG) in an equimolar ratio in a solution of NMP (N-methylpyrrolidone) heated at 70° C. for 7 hours (or until the solution is soluble in water). 3-(N-Glucidol-N-methyl)-2-hydroxypropyl methacrylate (GMHP) is thus obtained. The solvent (NMP) may or may not be removed, depending on the desired application. GMHP is a monomer that can especially crosslink in the presence of a radical initiator (thermal or photonic) or via irradiation using an electron beam (e-beam).

Several examples of gel preparation starting with the chelating monomer GMHP were performed. The thermal initiator used is (2,2'-azobis[2-methyl-N-(2-hydroxyethyl) propionamide]) sold under the name VA-086 by Wako Chemical USA.

Sample 7

An aqueous solution was prepared by introducing 0.625 g of $H_3BO_3$, 0.625 g of VA-086 and 12.5 g of GMHP dissolved in 12.5 g of NMP into 25 ml of $H_2O$.

10 ml of the solution thus obtained were taken and heated at 86° C. overnight. The gel obtained was left to cool for 1 hour, and the gel block was then immersed in 35 ml of demineralized water, and the change in the boron content was monitored by ICP spectrometry in order to determine the degree of boron retention in the gel matrix. The tests performed for three syntheses of GMHP performed under the same conditions showed that close to 30% of the boron is leached into the polymer matrix during an immersion in water lasting 11 days. These results are similar to those obtained for a gel based on an epoxy resin of Example 1.

Sample 8

An aqueous solution was prepared by introducing 0.625 g of disodium octaborate tetrahydrate (DOT), 0.625 g of VA-086 and 12.5 g of GMHP dissolved in 12.5 g of NMP into 25 ml of $H_2O$.

The solution was treated in the same manner as that of sample 7, but limiting the heating time at 86° C. to 3 hours. The ICP spectrometry measurements show that close to 35% of the boron is leached from the polymer matrix during immersion in water for 14 days. These results are similar to those obtained for a gel based on an epoxy resin of Example 1 for an identical test, and to those of sample 7 prepared from boric acid.

Sample 9

An aqueous solution was prepared by introducing 0.625 g of $H_3BO_3$, 31.25 mg of $CuSO_4.5H_2O$, 0.625 g of VA-086 and 12.5 g of GMHP in the form of a solution at 37% by weight in NMP into 25 ml of $H_2O$.

The use of copper sulfate as co-bioside is intended to improve the efficacy of the treatment with respect to rot attack.

The solution was treated in the same manner as that of sample 7, but limiting to 3 hours (instead of overnight) the maintenance time at 86° C. The ICP spectrometry measurements show that close to 67% of the boron and 75% of the copper remain in the polymer matrix during immersion in water for 8 days. These results are similar to those obtained for a gel based on an epoxy resin of Example 1 for an identical test, and to those of sample 7 prepared from boric acid.

Sample 10

An aqueous solution was prepared by introducing 0.625 g of $H_3BO_3$, 0.625 g of potassium persulfate (KPS) and 12.5 g of GMHP in the form of a solution at 66% by weight in water into 10 ml of $H_2O$.

10 ml of the solution thus obtained were taken up, and it was found that crosslinking took place gradually without external heating, via the action of the thermal initiator KPS on GMHP. The block of gel obtained was immersed in 35 ml of demineralized water and the change in the boron content was monitored by ICP spectrometry. The leaching tests of the gel blocks showed that close to 40% of the boron is leached out of the polymer matrix during immersion in water for 8 days. These results are similar to those obtained for a gel based on an epoxy resin.

In a wood matrix, at a site of use, a solution containing an acrylate monomer can be activated with a heating element temporarily inserted into the cavity (during the use of a thermal initiator) or by irradiation with a portable and flexible UV lamp (during the use of a photoinitiator).

Although the present invention has been described with the aid of specific embodiments, it is understood that several variations and modifications may be made to said implementations, and the present invention is intended to cover such modifications, uses or adaptations of the present invention, following, in general, the principles of the invention and including any variation of the present description that will become known or conventional in the field of activity to which the present invention belongs, and which may be applied to the essential elements mentioned above.

The invention claimed is:

1. A process for treating a wooden article, comprising introducing a treating composition into at least one cavity of the wooden article, wherein the treating composition contains:
   at least one wood preserving agent selected from the group consisting of fungicides, bactericides and insecticides;
   at least one chelating agent that complexes at least one preserving agent;
   a polymer precursor that forms a polymer matrix after injection into the cavities;
   optionally a liquid support; and
   optionally a surfactant;
   wherein at least one orifice is formed in the wooden article, into which the treating composition is introduced,
   wherein the process is performed curatively on a wooden article comprising at least one cavity, wherein said at least one orifice drilled into the wooden article connects the surface of the article to an inner cavity, and the treating composition is injected into the cavities via the orifice.

2. The process according to claim 1, wherein the content of preserving agent in the treating composition is of 0.1% to the saturation concentration by weight.

3. The process according to claim 1, wherein the content of preserving agent is lower than 10% by weight.

4. The process according to claim 1, wherein the treating composition has a viscosity of less than 100 Pas at 20° C. prior to introduction into the article to be treated.

5. The process according to claim 1, wherein the treating composition is injected into the wooden article at a pressure below 10atm.

6. The process according to claim 5, wherein the pressure is between 1 and 2 atm.

7. The process according to claim 1, wherein the injection is performed under pressure.

8. The process according to claim 1, wherein the preserving agent is a fungicide.

9. The process according to claim 8, wherein the fungicide is selected from the group consisting of boron compounds, phosphates, silicates, copper sulfate and sodium fluoride.

10. The process according to claim 9, wherein the fungicide is selected from the group consisting of boric acid, borax and sodium octaborate.

11. The process according to claim 1, wherein the treating composition contains at least two fungicides.

12. The process according to claim 10, wherein the fungicide content of the treating composition is at least 0.015 M.

13. The process according to claim 1, wherein the preserving agent is a bactericide.

14. The process according to claim 13, wherein the bactericide is selected from the group consisting of copper sulfate and sodium perborate.

15. The process according to claim 1, wherein the preserving agent is an insecticide.

16. The process according to claim 15, wherein the insecticide is selected from the group consisting of boric acid, borax and sodium octaborate.

17. The process according to claim 1, wherein the chelating agent represents at least a compound comprising hydroxyl and/or amine and/or carboxylic acid functions.

18. The process according to claim 17, wherein the chelating agent is selected from the group consisting of polyamines, polyols and polyolamines.

19. The process according to claim 17, wherein the chelating agent is a compound that has a nitrogen atom and vicinal hydroxyl functions, capable of chelating boron or copper compounds.

20. The process according to claim 17, wherein the chelating agent is selected from the group consisting of n-methyl-D-glucamine (NMG), tris(hydroxymethyl)aminomethane (THAM), 1,3-bis[tris(hydroxymethyl)- methylamino]propane, (hydroxyethyl)amine, di(hydroxyethyl)amine, and iminodicarboxylic acids.

21. The process according to claim 1, wherein the preserving agent is a copper compound and the chelating agent is ethylenediaminetetraacetic acid (EDTA).

22. The process according to claim 1, wherein the polymer precursors are selected from the group consisting of acrylic acid, ethers, glycols, acrylamides, vinylpyrrolidone, vinyl alcohol, acrylates and organohalosilanes.

23. The process according to claim 1, wherein the treating composition contains two different precursors that react to form a polymer matrix.

24. The process according to claim 23, wherein the treating composition is prepared by first mixing one of the precursors, referred to as precursor 1, with at least one preserving agent, and then adding the second precursor (referred to as precursor 2) and at least one chelating agent, precursor 1 being chosen such that it contains functions that allow it to graft the chelating agent, and then to react with precursor 2.

25. The process according to claim 24, wherein the ratio of the reactive functions of precursor 1relative to the reactive functions of precursor 2 corresponds substantially to the stoichiometry.

26. The process according to claim 24, wherein the total content of the three compounds (chelating agent, precursor 1 and precursor 2) in a treating composition containing a liquid support is comprised between 0.1 and 95% by weight.

27. The process according to claim 26, wherein the total content of the three compounds is comprised between 5 and 70% by weight.

28. The process according to claim 24, wherein the precursors are precursors of a polymer of the polyepoxy type.

29. The process according to claim 28, wherein the precursor 1 is a compound having at least two glycidyl ether groups and the precursor 2 is a compound having at least two groups capable of reacting with a glycidyl ether group.

30. The process according to claim 29, wherein the groups capable of reacting with a glydiyl ether group are selected from the group consisting of primary or secondary amine groups, OH groups and anhydride groups.

31. The process according to claim 28, wherein precursor 1 is a 5 polyethylene having a molecular mass of less than 1000 g/mol and a glycidyl ether group at each of its ends (PEDGE).

32. The process according to claim 29, wherein, in a first step, the diamine is mixed with a chelating agent, then immediately before the moment of injection of the treating composition, precursor 1 and the preserving agent are added.

33. The process according to claim 29, wherein the proportions of the polymer precursors are such that the number of glycidyl ether functions in precursor 1 are equivalent to the number of amine hydrogen atoms in precursor 2 and in the chelating agent.

34. The process according to claim 1, wherein the chelating agent/preserving agent mole ratio is 2, and the preserving agent is a boron 20 compound.

35. The process according to claim 1, wherein the precursor is chosen from those that polymerize in the presence of a thermal or photochemical initiator, the composition comprising a polymerization initiator and the process comprising an additional step consisting in heating or irradiating the treating composition after injection.

36. The process according to claim 35, wherein the precursor is a compound bearing vinyl groups, selected from the groups consisting of acrylic derivatives and monomers bearing epoxy groups or siloxane groups.

37. The process according to claim 36, wherein the precursor is a glycidyl methacrylate.

38. The process according to claim 1, wherein the liquid support of the treating composition is substantially formed of water or an environment friendly organic solvent or a mixture thereof.

39. The process according to claim 38, wherein the organic solvent is selected from the group consisting of alcohols and ketones.

40. A wooden article treated by a process according to claim 1, wherein it has at least one cavity impregnated with a gel formed of a polymer matrix and the liquid support and containing one or more chelating agents and one or more preserving agents, wherein the gel formed in the cavity has the following characteristics:

a water solubility at room temperature of at least 10%;

a content of fungicidal agent corresponding to a concentration that is between 0.1% and 10% by weight of the solution;

rheological characteristics of the gel such that a standard rheological measurement demonstrates that, in the region of the working temperature, the storage modulus (G') is greater than the loss modulus (G"); and a swelling power in the presence of water that is, when measured according to the weighing method, at least greater than 5% of the weight of polymer formed.

41. The wooden article according to claim 40, wherein the gel formed in the cavity has a water solubility at room temperature of at least 95%.

* * * * *